United States Patent

[11] 3,566,127

| [72] | Inventor | Theodore Hafner<br>265 Riverside Drive, New York, N.Y. 10036 |
|---|---|---|
| [21] | Appl. No. | 726,268 |
| [22] | Filed | Apr. 5, 1968 |
| [45] | Patented | Feb. 23, 1971 |

[54] LONG DISTANCE TRANSMISSION OF COHERENT WAVES
26 Claims, 16 Drawing Figs.

[52] U.S. Cl............................................... 250/199,
350/96, 350/169, 250/204
[51] Int. Cl............................................... H04b 9/00
[50] Field of Search.......................................... 250/199,
202, 204, 205, 221, 213; 331/94.5; 350/96, 96
(T), 964 (WG), 169—174, 171 (DRL)

[56] References Cited
UNITED STATES PATENTS

| 3,423,593 | 1/1969 | Chinnock | 350/96WG |
| 3,466,111 | 9/1969 | Ring | 350/96WG |
| 3,468,598 | 10/1969 | Ito | 350/96WG |

*Primary Examiner*—Richard Murray
*Assistant Examiner*—Albert J. Mayer

ABSTRACT: An optical beam wave guide has an array of lenses for guiding light beams to and from a multichannel transmit/receive system. The array of lenses are adjusted by a servosystem to maintain the multiple light beams parallel to each other.

PATENTED FEB 23 1971 3,566,127

INVENTOR
THEODORE HAFNER

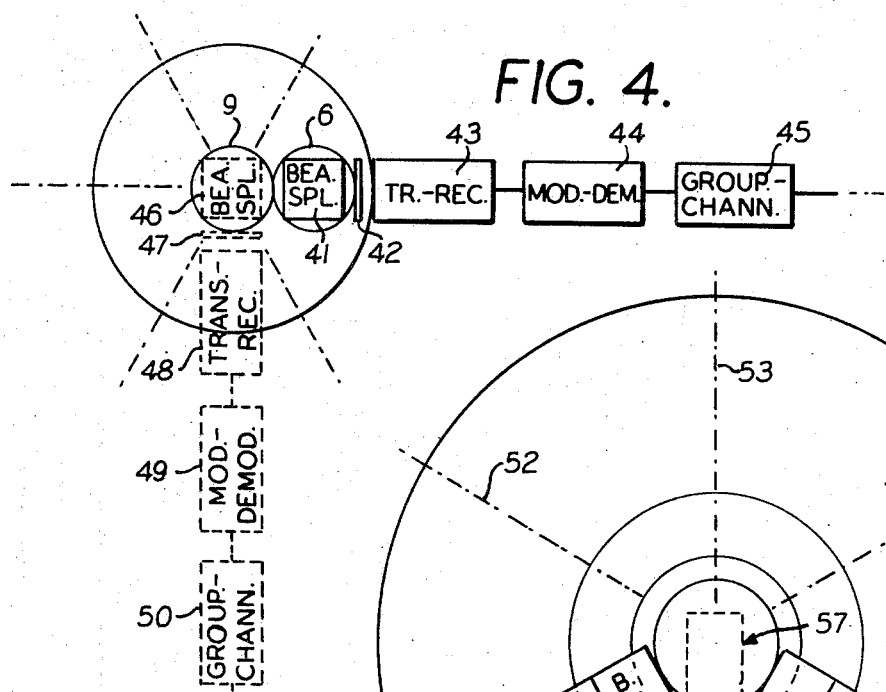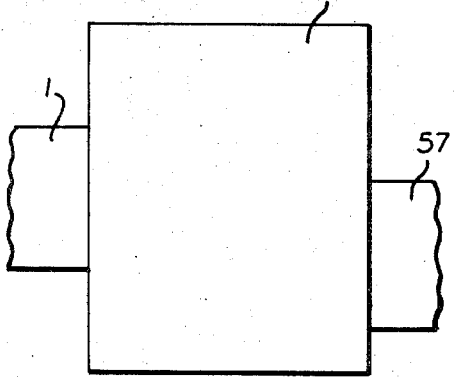

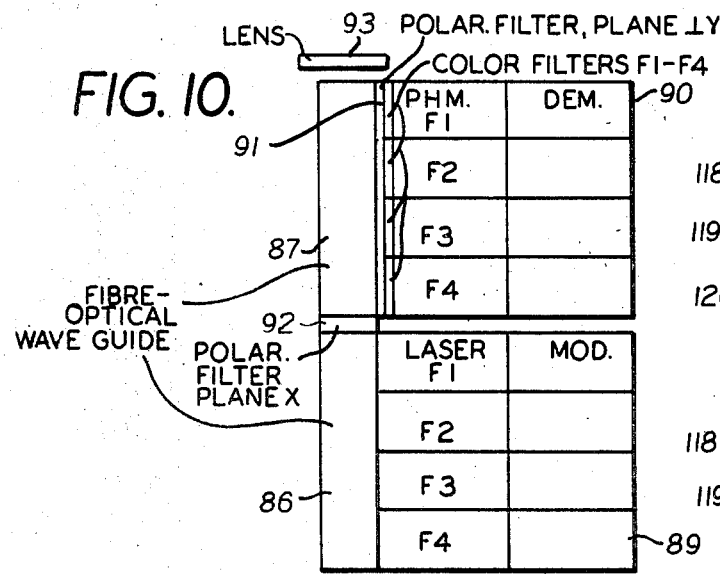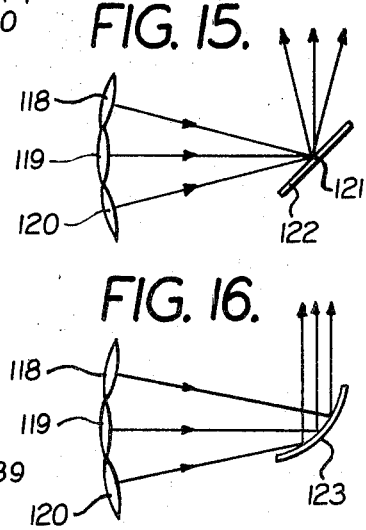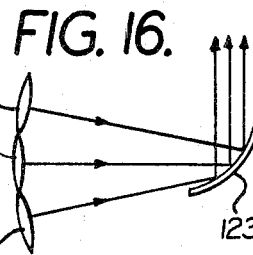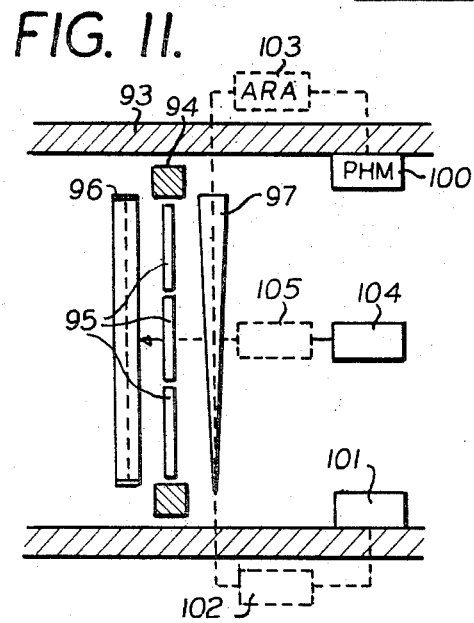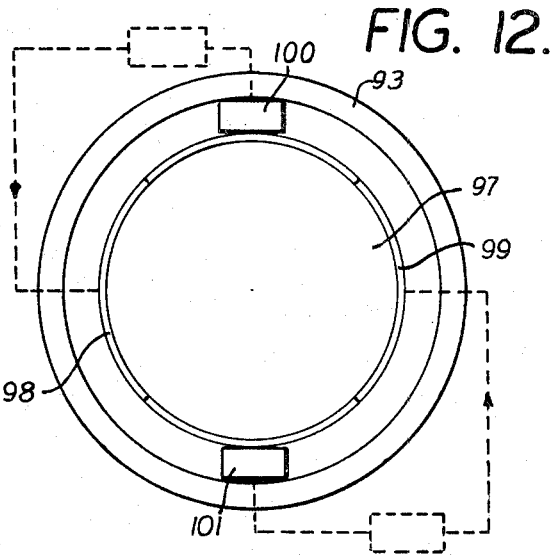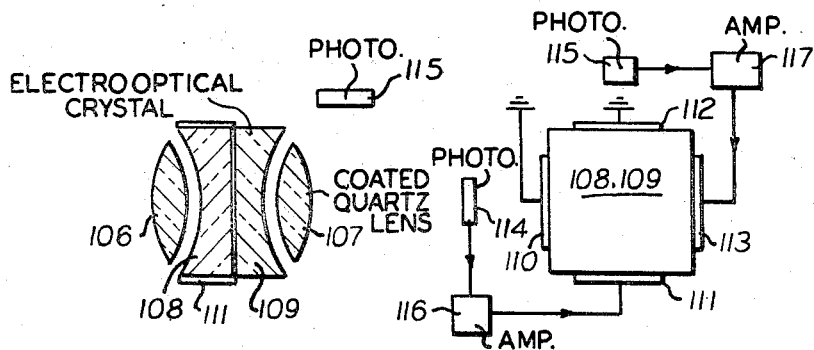

LONG DISTANCE TRANSMISSION OF COHERENT WAVES

This invention relates to the long distance transmission of electromagnetic waves, especially coherent light.

The invention consists of essentially a pipeline comprising several arrays of lenses, such arrays containing a number of lenses arranged juxtaposed in a plane substantially perpendicular to the axis of the pipe, with the arrays being spaced along the axis of the pipe in parallel planes at distances determined by the light frequency and the radius of the lenses so as to permit transmission of a number of parallel coherent wave beams, especially coherent light, from one plane to another, substantially independent from each other, and a number of beam splitting means for each lens, partly deflecting in one direction and partly transmitting in a direction perpendicular thereto; the latter direction being the axis of said lens, said beam splitting means superimposed on each other, substantially along the axis of said lens so as to permit waves derived in a first direction from said lens to be split in a direction perpendicular thereto into a number of waves, simultaneously to permit a number of other waves to be derived from other perpendicular directions to be transmitted to said lens in one and the same direction substantially identical with said first direction.

These and other objects of the invention will be more fully apparent from the drawings annexed hereto. This invention relates to the beam waveguide such as has been disclosed in U.S. Pat. No. 3,101,472.

Such a beam waveguide may consist of a number of lenses following each other, spaced and dimensioned to compensate diffraction occuring inbetween.

One of the objects of the invention is to permit long distance transmission over such a beam waveguide especially of coherent waves, such as coherent light waves, which have a great channel carrying capacity.

This capacity of the beam waveguide compares favorably with the capacity of coaxial cables or other waveguides since it can effectively transmit a much greater number of channels by simultaneously superimposing or putting in parallel in a single physical structure a great number of light beams.

Thus, for example, as will be shown more clearly further below, if connected to a laser or lasers, such a laser beam waveguide system compares with the capacity of 36,000 two-way telephone channels of the new Bell telephone cal cable which consists of 20 coaxial cables each carrying 1,800 channels.

Such a laser bean waveguide system could use four laser frequencies, such as 0.4880, 0.5145, 0.5682 and 0.6510 mu. These frequencies can be produced with powers extending from 100 mw. to 1 Watt. The beam waveguide would be a 7-beam guide, so that the total number of beams would amount to $4 \times 7 = 28$ beams, each beam will be pulse code modulated with about $220 \times 10^6$ pulses/sec., which has already experimentally been demonstrated, as feasible.

This type of modulation will be sufficient for the transmission of at least six master groups of 600 telephone channels each, resulting in $28 \times 6 \times 600 = 100,800$ one-way telephone channels.

In view of the fact that pulse code modulation permits the maintaining of a relatively small interference distance, it is possible to use two perpendicular polarizations. This could result in the effective availability of 100,800 two-way telephone channels.

On the assumption of a laser power of 100 mw., which has proved to be available, and the available data for the sensitivity of receivers, the acceptable, loss between transmitter and receiver would amount to 40 db.

This would correspond to a spacing between repeaters of about 30 miles.

In the drawing annexed hereto FIG. 1 represents a cross section of an optical beam waveguide in the form of a pipeline embodying certain features of the invention.

FIG. 4 shows in a diagrammatical cross-sectional view, similar to that of FIG. 1, electrical and optical equipment operating on and from some of the lenses of the pipeline.

FIG. 5 shows in a view parallel to the axis of the pipeline the head station of an optical pipeline with electrical and optical equipment attached hereto.

FIG. 6 shows a corresponding sideview. invention.

Figure 2:
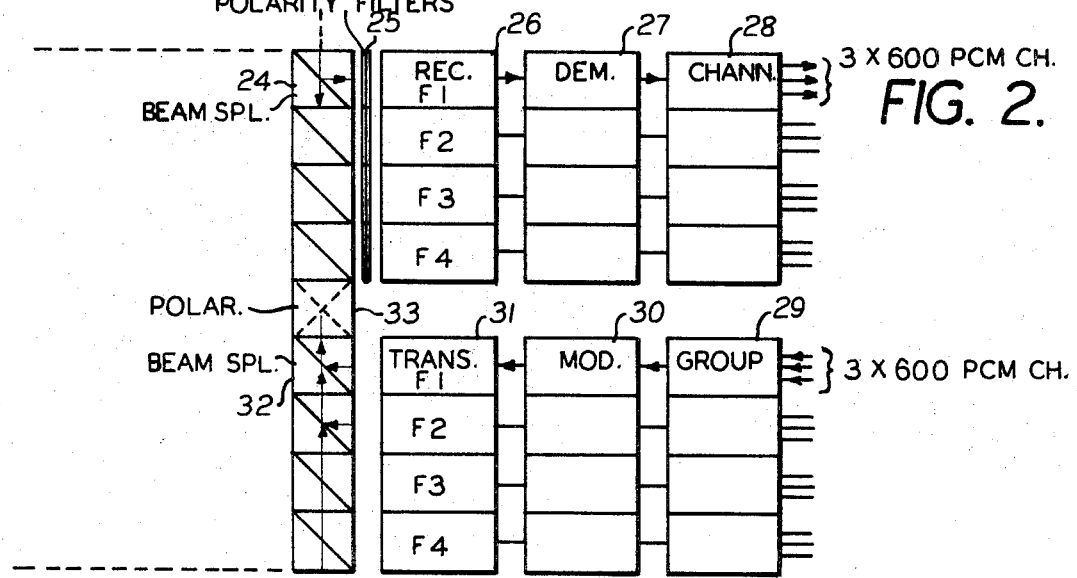
FIG. 2 shows in diagrammatical form optical and electrical equipment connected to one lens of the pipeline.
Figure 3:
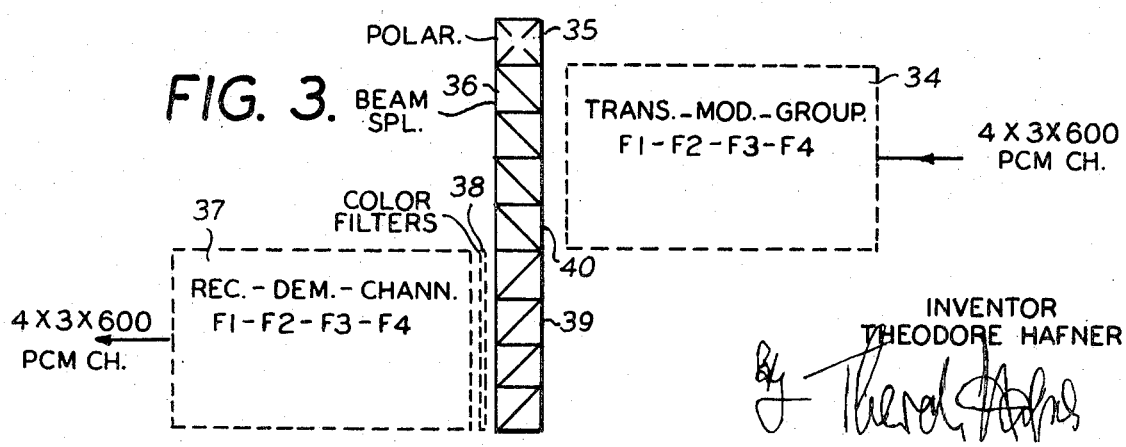
FIG. 3 shows modifications of FIG. 2.

FIGS. 7, 8 and 9 in front, side and top elevations respectively show another modification of the invention, especially as applied to FIGS. 2 and 3.

FIG. 10, in a diagrammatical top elevation, illustrates still another modification of the invention.

Figure 1:
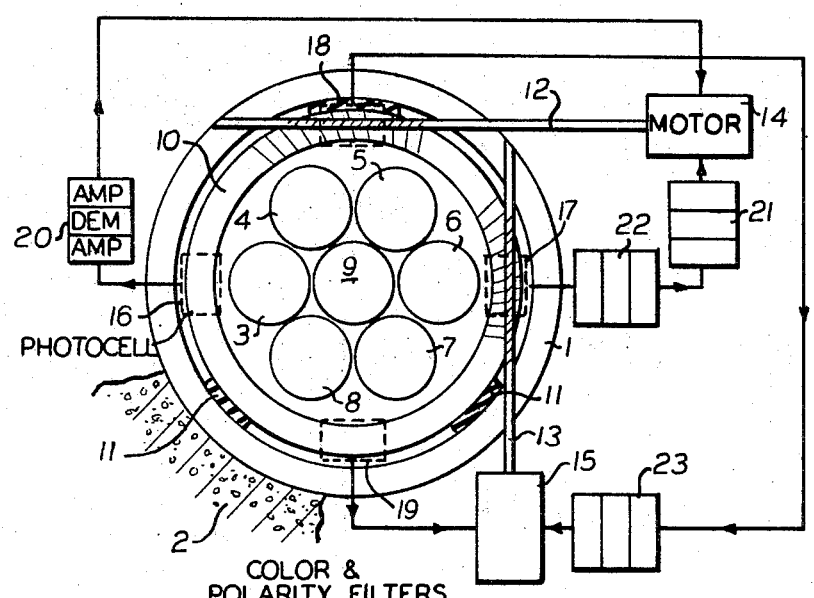

FIGS. 11 and 12, in side and front elevations respectively, show a modification of the control mechanism illustrated in FIG. 1.

FIGS. 13 and 14 show another modification of direct beam control in schematical side and front elevation, respectively and combined with a circuit diagram. FIGS. 15, 16 show further modifications of the invention.

As apparent from FIG. 1, a pipe 1, which may consist of metal, such as aluminum, or plastic, such as hard PV, is supported, preferably at least 3 feet below ground, on a concrete basis schematically indicated at 2.

The pipeline contains a number of arrays of lenses of the type schematically indicated at 3, 4, 5, 6, 7, 8, and 8, which are rigidly mounted in a ring-shaped structure or support, schematically indicated at 10, and somewhat flexibly supported on rubber or plastic cushions, schematically indicated at 11.

The position of ring 10 with respect to the pipe 1 is determined by the rotation of shafts 12, 13, operating in windings of rings 10, in such a way so that by rotation of shafts 12 and 13 in one direction or another, ring 10 can be moved in opposite directions, horizontally and vertically respectively, under control of motors 14, 15, and against the pressure of flexible cushions 11.

Motors 14, 15 are controlled by photosensitive devices, such as photocells or photomultipliers, arranged in the wall of pipe 1, as schematically indicated at 16, 17 and 18, 19 respectively, in such a way that any deviation of the guided wave beams, passing through the lenses and affecting these devices, will cause a change in the output of the photosensitive devices 16 through 19, which, after amplification, demodulation and reamplification, at 20, 21, 22 and 23, are used to compensate any movement of the pipe causing a movement of the guided beams to be compensated by a movement of lens system 3—9 with respect to pipe 1, so as to maintain the alignment of succeeding lens arrays and a maximum efficiency of beam wave transmission over large distances.

As shown in FIG. 2, for example on one lens, 6, only, a plane polarized coherent light beam, arriving from pipe 1 of FIG. 1, and passing through lens 6, enters a sequence of semitransparent beam splitters, schematically indicated at 24, through which part of the light is transmitted to a number of subsequent beam splitters.

Part of the light is reflected, and after being filtered at 25, for the desired carrier frequency, entered into receivers 26, then demodulated at 27, and channeled at 28 into three groups of 600 pulse-code modulated channels, which are treated for further distribution in a manner well known per se.

Filter 25, which could be a composite filter containing a sheet of color transparency as well as a sheet of polarizing material to permit only entry of signals received from lens 7 but preventing signals coming from transmitters 31, from entering units 26.

In order to maintain a measure of equality of signal level in both transmitting and receiving paths, the transmitting and reflecting characteristics of the different beam splitters may be appropriately graduated, for example, at reception, decreasing in transparency from ¾ to ⅔ to ½ plus an additional constant, permitting the transmission of additional beams, and a transmission gradually from 0 to ½ to ⅔ to ¾, respectively.

Simultaneously, over the same light path of lens 6, coherent light of another polarization plane, perpendicular to the received one, is transmitted after having been grouped and modulated at 29, 30, respectively, from a number of transmitters lasers 31 of different frequencies which are directed upon a corresponding number of transmitter-beam splitters 32, and after passing a polarizing unit at 33, are passed through receive-beam splitters 24 and lens 6 on to the optical beam waveguide represented by pipeline 1 and its array of lenses, such as illustrated at 3—9.

FIG. 3 shows a modification of FIG. 2 in which the transmitting equipment with its polarizing device is schematically indicated at 34, 35, the associated quadruplet of beam splitters at 37 and the polarizing device at 36.

The corresponding receiving equipment is arranged vertically below as schematically indicated at 37, operated from a number of juxtaposed filters at 38, a corresponding quadruplet of beam splitters 39 and a polarizing device 40, arranged to receive and reflect the light in a direction opposite to that of beam splitters 36.

FIG. 4 shows the physical arrangement of the transmitting and receiving equipment around the axis of the pipeline.

Here again, the array of beam splitters operating on lens 6, is shown at 41, the filter array 42, the transmitter and receiver arrays at 43, the modulator and demodulator arrays at 44, the grouping and channeling arrays at 45.

A similar arrangement is shown for the center lens 9, in which the corresponding beam splitters must be arranged a little more distant from the lens itself, which for that reason may be differently dimensioned, because of the equipment associated with lenses 7, 8.

The corresponding equipment for center lens 9, in the form of beam splitters, which also includes the polarizer, is schematically indicated at 46, with filters at 47, transmitters and receivers at 48, modulators and demodulators at 49 and groupers and channelizers at 50, respectively.

The entire head portion of the coherent light pipeline is schematically shown in FIG. 5, here in the form of six units for lenses 3 to 8, schematically indicated at 51, 52,53,54,55,56 respectively, which may be separable with subunits, if desired.

51—56 contain beam splitters, polarizers, transmitters, receivers, modulators, and demodulators respectively for lenses 3—8.

A seventh similar unit which is indicated in dotted line at 57, and which somewhat projects from units 51—56, indicated in the sideview of FIG. 6, serves center lens 9.

The space between units 51 to 56 can be filled out with associated equipment such as indicated for example for unit 51 by modulator containing grouping and channelizing equipment 58, the subgrouping and subchannelizing equipment 59,60,61 for each of the three groups of 600 pulse-code modulated channels transmitted by the 28 laser beams.

In order to reduce light losses to a minimum, as apparent from FIG. 7, 8, and 9, receiving and transmitting paths associated with a lens of the beam waveguide, can be separated by providing two beam splitters, one, 61, directly connected to the beam waveguide lens, schematically indicated at 63, and representing substantially the receiving path of the system; another beam splitter, 64, connected to 62, represents essentially the transmitting path for a unitary transmit-receive structure, associated with lens 63.

A polarizing filter, schematically indicated at 65, prevents the waves received from lens 63, which are polarized in one plane, for example in a vertical plane, from entering the transmitting path, which permits passage of waves only which are polarized in a perpendicular plane, for example in a horizontal plane.

The light transmitted through beam splitter 62, or a predetermined portion thereof, is distributed through a column of beam splitters of varying transmissivities, as schematically indicated at 66 to 69, to different receivers, such as photomultipliers 70 to 73 which may contain appropriate filters (not shown) or be otherwise sensitized differentially for the different frequencies to be received, and which are coupled to appropriate modulators, schematically indicated at 74—77, for further treatment and distribution as it is otherwise well known in the art and as it has also been indicated previously.

In a similar manner, the transmitter path is shown to extend from a series of modulators 78 to 81, and transmitters, such as lasers 82 to 85, over a column of beams splitters 86 to 89, to beam splitter 64 which through beam splitter 62 connects to the lens 63 of the beam waveguide.

The invention is not limited to glass optical elements, such as glass beam splitters, but it may also be applied without departing from the scope of this disclosure, to other types of waveguides for the coherent light such as fiber optical wave guides.

In such a case, as apparent from FIG. 10, fiber waveguides 86,87 are used to interconnect the transmitter and receiver modules 88,89, if necessary, with interposition of a polarizing filter, as schematically indicated at 90, and to connect both types of modules 88,89 through appropriate color and polarizing filters 92 91,92 to the lens 93 of a beam waveguide.

Such fiber optical waveguides may be replaced also without extending the scope of this invention with optical micro guides, made of a thin film of a fraction of a wavelength thickness.

Light energy with a polarization normal to the film is launched on to it. By replacing guide 86 with such a microguide, the polarizing filter 92 may be omitted.

Also, if necessary, receiving and transmitting modules may be connected separately to the associated lens of the beam waveguide by separate fiber-optical or microguides.

Thus the term beam splitter is to be interpreted in the widest possible sense as a circuit element or combination of such circuit elements, which permit guidance of coherent waves from one point to several points, and conversely.

In FIG. 11 the beams passing through a lens system are shown to be directly controlled by deviations of the beams under control of pipe movement.

As apparent from FIGS. 11 and 12, pipe 93 supports a lens array schematically indicated by holder 94 and lenses 95 in a manner not shown.

The light beams passing through lenses 95 in one or opposite directions are passed through a pair of electrooptically sensitive crystalline elements schematically indicated at 96,97, which are arranged with their principal axis perpendicular to each other.

When application of an electric field to an optical medium results in a perturbation of its refractive properties, the phenomenon is called electro-optic effect. In liquids and some solids, where the changes in refractive indexes exhibit a quadratic dependence upon the field, it is designated the Kerr effect.

Crystalline solids that are piezoelectric display a linear relationship known as the Pockels effect. As a result of their linear electro-optic response, low conductivity, high optical transparency throughout the visible spectrum, high optical quality, and availability in large quantities, the materials that are of particular interest in this connection are the tetragonal crystals, potassium dihydrogen phosphate (KDP) and the more sensitive deuterated isomorph, potassium dideuterium phosphate (KD*P). In these crystals, there exists a unique axis that represents the preferred direction for application of the electric field.

This is the so-called optic axis or $c$ axis, designated by crystallographers as the (001) direction. If a beam of plane-polarized light traverses the crystal along the (110) direction perpendicular to the electric field, and if its polarization is also perpendicular to the field in the (110) direction, it experiences a change of the refractive index as the field is varied.

As apparent from FIGS. 11 and 12, crystalline wedges exhibiting the Pockels effect and illustrated schematically at 96 and 97, provided with electrodes indicated schematically in FIG. 12 for wedge 97, at 98 and 99, are controlled by photomultipliers, arranged in the path of the light, as shown for example in FIGS. 11 and 12 at 100 and 101, which derive through appropriate circuitry schematically indicated at 102,103, signals representing deviations of the beams and which apply these signals, if necessary, after amplification, rectification and reamplification in the form of envelope signals, to the electrodes 98,99 of crystalline wedge 97, causing the wedge to change the position of the beams passing through so as to compensate changes of beam positions caused by pipe movements.

Similarly, in a direction perpendicular thereto, a crystalline wedge 96 is controlled by photoelectric multipliers of which one is shown at 104, arranged in positions perpendicular to the position of photomultipliers 100 and 101.

Photomultiplier 104 controls over other circuitry, including amplifier, rectifier, and reamplifier, schematically indicated at 105, electrodes attached to wedge 96 and causing a movement of the beams in a perpendicular direction, thus compensating changes in beam position as signaled by photomultiplier 104 and, if necessary, by another photomultiplier arranged in a pipe 93 in a diametrical position.

In this way, a direct electronic control of the beam position is achieved under control of the beam position itself without any injection of mechanical movements such as shown in the control illustrated in FIG. 1.

Although the Pockels effect, because of its linearity and low light loss is preferred, the Kerr cell effect can also be used in connection with circuit elements, compensating, if necessary, the square characteristic effect of Kerr cells.

In a further modification of this direct beam control, as apparent from FIGS. 13 and 14, a lens system contained in a tube or pipeline, such as shown in FIG. 11 at 93, is schematically illustrated to consist of a pair of lenses arranged back to back, at 106, 107, with a space arranged therebetween, forming a phase correcting unit for a single coherent light beam.

In case the beam waveguide should contain in a planar array a number of parallel light bema beams, a number of lens pairs may be arranged, but preferably only one lens pair needs to be provided with a direct beam controlling unit, such as illustrated here.

In the space between the two lenses 106,107, there is arranged an electrooptically effective crystal structure, consisting in this example of two halves, 108,109, with their electrooptical axes perpendicular to each other, such as described previously, and provided with two pairs of electrodes, schematically indicated at 110,111, and 112, 113 respectively.

In addition, there are photoelectrically effective units, such as photocells or photomultipliers, indicated at 114,115 respectively, arranged in the path of the beam at peripherally displaced quadrature positions.

Photocells 114,115 permit registration of light beam changes caused by accidental beam movements due to the movement of two supporting frame or pipe structures on which the lens system 106,107 is supported.

These light changes cause electrical signals which over amplifiers 116,117, or amplifier-rectifiers or demodulators, designed to amplify and at the same time to eliminate the light changes caused by the desired modulations of the beam are applied to the electrodes 110,111 and 112,113 of crystals 108,109 causing the light beam on its passage through these crystals to be deviated in one or the other direction, thereby compensating directly the movement of the light beam due to the undesired movements of the light beam or lens supports.

FIG. 15 shows a modification of the invention in which the lenses of the beam waveguides, schematically indicated at 118,119,120, are arranged, slightly inclined, to converge on practically a single point, schematically indicated at 121, from which they are deflected by a transparent or semitransparent mirror or prism, schematically indicated at 122, into other directions for further propagation and/or exploitation.

As apparent from FIG. 16, mirror 122 may be replaced by a curved mirror 123 to produce a plane parallel beam combining all the beams derived from mirror and lenses 118,119,120,121 etc. into a predetermined direction in which the three or more beams can be treated as a single substantially cylindrical beam to be further transmitted as a beam waveguide, or taken off, or exploited in any desired manner without departing from the scope of this invention.

While the invention has been described and illustrated in connection with a number of frequencies, lenses, beam splitter devices, filters, polarizing devices, coherent transmitters and receivers, modulators and demodulators, groupers and channelizers, it is not limited to the specific equipment and arrangement shown and demonstrated, but may be applied in any other appropriate arrangement with any number of lenses and/or other elements, and any amount and any type of circuitry without departing from the scope of this disclosure.

I claim:

1. A pipeline comprising several arrays of lenses, such arrays containing a number of lenses arranged juxtaposed in a plane substantially perpendicular to the axis of the pipe, with the arrays being spaced along the axis of the pipe in parallel planes at distances determined by the light frequency and the radius of the lenses so as to permit transmission of a number of parallel coherent wave beams, especially coherent light, from one plane to another, substantially independent from each other, and a number of beam splitting means for each lens, partly deflecting in one direction and partly transmitting in a direction perpendicular thereto; the latter direction being the axis of said lens, said beam splitting means superimposed on each other, substantially along the axis of said lens so as to permit waves derived in a first direction from said lens to be split in a direction perpendicular thereto into a number of waves, simultaneously to permit a number of other waves to be derived from other perpendicular directions to be transmitted to said lens in one and the same direction substantially identical with said first direction.

2. Pipeline according to claim 1 comprising polarizing means for a perpendicular plane arranged in front of the transmitting beam splitting means.

3. Pipeline according to claim 1 wherein receiving and transmitting beam splitting means are arranged on top of each other.

4. Pipeline according to claim 1 wherein polarizing means are arranged in front of the transmitting beam splitting means.

5. Pipeline according to claim 3 wherein the reflected waves for transmitter and receiver are directed in substantially parallel directions.

6. Pipeline according to claim 3 wherein the reflected waves for transmitter and receiver are directed in substantially opposite directions.

7. Pipeline according to claim 1 wherein beam splitting means for the different lenses of an array of lenses are arranged around the axis of the pipeline in a substantially parallel array extending along the axis of the lenses, with said transmitter and receiver substantially extending in a direction perpendicular thereto, forming unitary structures therewith.

8. Pipeline according to claim 1 wherein said unitary structures include corresponding modulators and demodulators.

9. Pipeline according to claim 1 wherein said transmitters and receivers are of different frequencies associated with the different beam splitting means.

10. Pipeline according to claim 1 wherein the transmitters are lasers of different frequencies.

11. Pipeline according to claim 1 wherein the receivers are multipliers of different frequency sensitivities.

12. Pipeline according to claim 1 comprising filters in front of transmitters of substantially the same frequency range.

13. Pipeline according to claim 1 comprising filters in front of the receivers of substantially the same frequency range.

14. Pipeline according to claim 1 comprising transmitting and receiving means of different frequencies under control, and controlling, respectively, pulse-code modulated channels, the waves transmitted and received, respectively, being polarized in substantially perpendicular planes.

15. Pipeline according to claim 1 comprising photosensitive means arranged within the pipe and means under control of said photosensitive means to realign the position of at least one array, under control of movements of the pipeline so as to maintain alignment of the lenses in succeeding arrays.

16. Pipeline according to claim 15 wherein said control means are under control of an envelope of beam signals derived from at least some of said beams so as to make the realignment substantially independent from modulation of said beams.

17. Pipeline according to claim 15 wherein the center beam is used to control the position of the lines arrays and wherein the lenses surrounding the center beam are used to transmit modulations.

18. Pipeline according to claim 1 wherein said beam splitting means have transparencies gradually changing from one to the next one.

19. Pipeline according to claim 18 wherein said beam splitting means have transparencies decreasing from one to the next one in the approximate ratio for each quadruple from ¾ to ⅔ to ½ to 1 plus a constant transparency added to each of these transparencies to permit transmission of additional light beams.

20. Pipeline according to claim 1 comprising sensitive means for producing signals representing beam deviations due to pipe movement, arranged in the path of the light, and an electrooptically sensitive medium arranged in the path of the light for deflecting the light under control; an electric field applied to said medium, means under control of, and signal for producing an electric field in said medium to change its refractive properties in such a way as to deflect the light in a direction to at least partly compensate the change in deflection caused by the movement of the pipe.

21. Pipeline according to claim 1 wherein said electrooptically sensitive medium is a medium exhibiting a Kerr cell effect.

22. Pipeline according to claim 1 wherein said electrooptically sensitive medium is a medium exhibiting the Pockels effect.

23. Pipeline according to claim 1 comprising electrooptically sensitive wedges exhibiting the Pockels effect arranged one behind the other, with their principal axis substantially perpendicular to each other, and photosensitive means also arranged at axis substantially perpendicular to each other to control the refraction properties of these wedges under control of pipe movements resulting in signal deviations produced by said photosensitive means.

24. In a beam waveguide, a pipeline containing at least one pair of lenses arranged back to back with a space therebetween so as to permit phase correction at this point, and arranged between said lenses, electrooptically effective crystal means for deviating said beam under control of an electric field applied thereto; photoelectric pickup means to produce beam deviations due to undesired movement of the lens system and means under control of said pickup means to produce at least one field for correcting the beam passing through said crystal means to compensate for said undesired beam movements.

25. Beam waveguide according to claim 24 wherein said crystal means consist of at least two electrooptically perpendicular crystals and wherein said photoelectric pickup means include at least two pickup means arranged in quadrature position.

26. Beam waveguide according to claim 24 wherein said pickup means are connected to means, including amplifiers, for preventing the desired modulations of the beam from being applied to said crystal means.